United States Patent
Chang et al.

(10) Patent No.: US 11,487,638 B2
(45) Date of Patent: Nov. 1, 2022

(54) COMPUTER PROGRAM PRODUCT AND METHOD AND APPARATUS FOR CONTROLLING ACCESS TO FLASH MEMORY CARD

(71) Applicant: Silicon Motion, Inc., Zhubei (TW)

(72) Inventors: Chun-Chieh Chang, Taipei (TW); Hsing-Lang Huang, Zhubei (TW)

(73) Assignee: SILICON MOTION, INC., Zhubei (TW)

( * ) Notice: Subject to any disclaimer, the term of this patent is extended or adjusted under 35 U.S.C. 154(b) by 310 days.

(21) Appl. No.: 17/014,169

(22) Filed: Sep. 8, 2020

(65) Prior Publication Data

US 2021/0303432 A1    Sep. 30, 2021

(30) Foreign Application Priority Data

Mar. 25, 2020 (CN) .......................... 202010218435.9

(51) Int. Cl.
| | | |
|---|---|---|
| G06F 11/00 | (2006.01) |
| G06F 11/30 | (2006.01) |
| G06F 11/07 | (2006.01) |
| G06F 12/02 | (2006.01) |
| G06F 13/40 | (2006.01) |
| G06F 9/4401 | (2018.01) |

(52) U.S. Cl.
CPC ........ *G06F 11/3058* (2013.01); *G06F 9/4418* (2013.01); *G06F 11/076* (2013.01); *G06F 11/3037* (2013.01); *G06F 12/0246* (2013.01); *G06F 13/409* (2013.01); *G06F 13/4068* (2013.01)

(58) Field of Classification Search
CPC .............. G06F 11/3058; G06F 11/076; G06F 11/3037; G06F 11/3031; G06F 11/3034
See application file for complete search history.

(56) References Cited

U.S. PATENT DOCUMENTS

| | | | | |
|---|---|---|---|---|
| 6,178,526 B1 * | 1/2001 | Nguyen | ................. | G01R 31/01 714/42 |
| 7,370,242 B2 * | 5/2008 | Chen | ......................... | G06F 1/20 702/132 |

(Continued)

*Primary Examiner* — Amine Riad
(74) *Attorney, Agent, or Firm* — Birch, Stewart, Kolasch & Birch, LLP

(57) ABSTRACT

The invention is related to a non-transitory computer program product, a method and an apparatus for controlling access to a flash memory card. The method, performed by a processing unit of a bridge integrate circuit (IC), includes: determining whether a temperature of a motherboard has exceeded a threshold through a temperature sensor IC after receiving a host read or write command from a host side; requesting a flash memory card to enter a sleep state when the temperature of the motherboard has exceeded the threshold; and instructing the flash memory card to perform an operation corresponding to the host read or write command when the temperature of the motherboard hasn't exceeded the threshold. The bridge IC and the temperature sensor IC are disposed on the motherboard, the flash memory card is inserted into a card slot on the motherboard, and the bridge IC is coupled to the temperature sensor IC and the flash memory card through a circuit of the motherboard.

20 Claims, 5 Drawing Sheets

(56) References Cited

U.S. PATENT DOCUMENTS

| | | | | |
|---|---|---|---|---|
| 7,644,218 B2* | 1/2010 | Deng | ............ | G06F 3/0679 |
| | | | | 710/10 |
| 8,341,335 B2* | 12/2012 | Weingarten | ......... | G06F 12/0246 |
| | | | | 711/170 |
| 8,554,389 B2* | 10/2013 | Cox | ............ | G06F 1/3203 |
| | | | | 320/144 |
| 9,015,501 B2* | 4/2015 | Gee | ............ | G06F 9/505 |
| | | | | 713/300 |
| 9,335,814 B2* | 5/2016 | Rusu | ............ | G06F 1/3275 |
| 2003/0046020 A1* | 3/2003 | Scheuerlein | ............ | G01K 3/005 |
| | | | | 702/132 |
| 2005/0216221 A1* | 9/2005 | Broyles, III | ............ | G01K 1/08 |
| | | | | 702/132 |
| 2015/0111413 A1* | 4/2015 | Jiang | ............ | H04M 1/026 |
| | | | | 439/370 |
| 2015/0139272 A1* | 5/2015 | Hanking | ............ | G01J 5/025 |
| | | | | 374/121 |
| 2018/0143788 A1* | 5/2018 | Yadav | ............ | G06F 3/0679 |

* cited by examiner

COMPUTER PROGRAM PRODUCT AND METHOD AND APPARATUS FOR CONTROLLING ACCESS TO FLASH MEMORY CARD

CROSS-REFERENCE TO RELATED APPLICATIONS

This application claims the benefit of priority to Patent Application No. 202010218435.9, filed in China on Mar. 25, 2020; the entirety of which is incorporated herein by reference for all purposes.

BACKGROUND

The disclosure generally relates to storage devices and, more particularly, to a computer program product, a method and an apparatus for controlling access to flash memory card.

A Universal Serial Bus (USB) memory drive is a data storage device that includes flash memory with an integrated USB interface. It is typically removable, rewritable and small. Its storage capacity may be from 16 gigabytes (GB) to 1 terabytes (TB). USB memory drives are often used for storage, data back-up and transfer of computer files, or others. However, with increased speed of data access to flash memory, the temperature of USB memory drive may go high beyond a tolerable operating condition, resulting in unexpected errors that are occurred in executions of the read/write commands. Thus, it is desirable to have a computer program product, a method, and an apparatus for controlling access to a flash memory card.

SUMMARY

In an aspect of the invention, an embodiment introduces a non-transitory computer program product for controlling access to a flash memory card when executed by a processing unit of a bridge integrate circuit (IC). The non-transitory computer program product includes program code to: determine whether a temperature of a motherboard has exceeded a threshold through a temperature sensor IC after receiving a host read or write command from a host side; request a flash memory card to enter a sleep state when the temperature of the motherboard has exceeded the threshold; and instruct the flash memory card to perform an operation corresponding to the host read or write command when the temperature of the motherboard hasn't exceeded the threshold.

In another aspect of the invention, an embodiment introduces a method for controlling access to a flash memory card, performed by a processing unit of an IC, includes: determining whether a temperature of a motherboard has exceeded a threshold through a temperature sensor IC after receiving a host read or write command from a host side; requesting a flash memory card to enter a sleep state when the temperature of the motherboard has exceeded the threshold; and instructing the flash memory card to perform an operation corresponding to the host read or write command when the temperature of the motherboard hasn't exceeded the threshold.

In still another aspect of the invention, an embodiment introduces an apparatus for controlling access to a flash memory card to include a host interface (I/F); a device I/F; an input/output (I/O) I/F; and a processing unit. The processing unit is arranged operably to determine whether a temperature of a motherboard has exceeded a threshold through the temperature sensor IC after receiving a host read or write command from a host side; request the flash memory card to enter a sleep state through the device I/F when the temperature of the motherboard has exceeded the threshold; and instructing the flash memory card to perform an operation corresponding to the host read or write command through the device I/F when the temperature of the motherboard hasn't exceeded the threshold.

The bridge IC and the temperature sensor IC are disposed on the motherboard, the flash memory card is inserted into a card slot on the motherboard, and the bridge IC is coupled to the temperature sensor IC and the flash memory card through a circuit of the motherboard.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first," "second," "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

Figure 1:
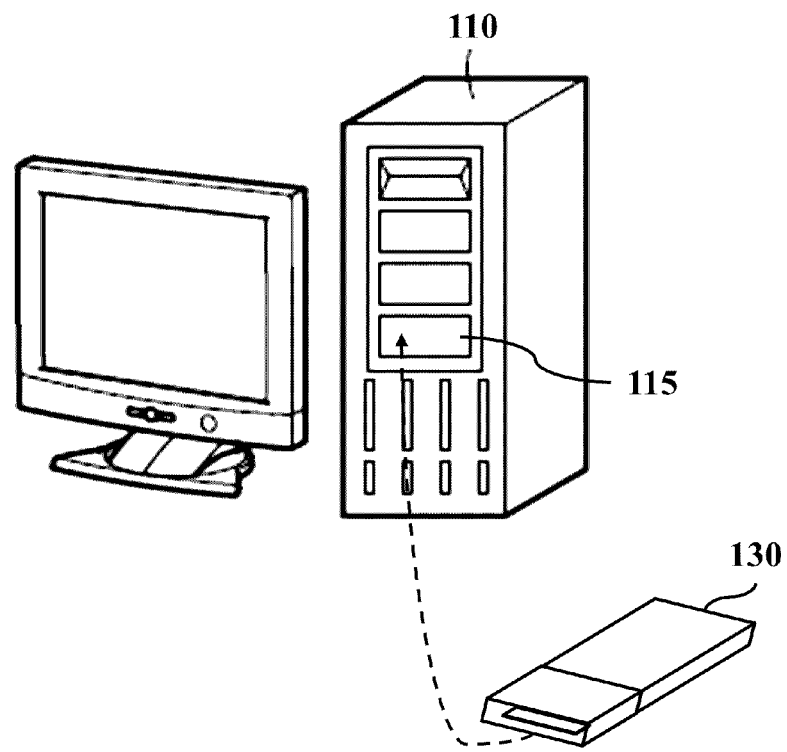
FIG. 1 is a schematic diagram of the use of a universal serial bus (USB) memory drive according to an embodiment of the invention.

Refer to FIG. 1. After inserting the Universal Serial Bus (USB) memory drive 130 into the USB port 115 of the computer host 110, a user may back up data from a storage device in the computer host 110 to the USB memory drive 130, copy data in the USB memory drive 130 and store the copied one in the storage device in the computer host 110, or perform other data access operations. The USB memory drive 130 includes a high-volume NAND flash memory card from 16 gigabytes (GB) to 1 terabytes (TB). As the access speed increases, the NAND flash memory card tends to heat up during data access. However, for the convenience of portability, the USB memory drive 130 is manufactured to be as small as possible, which makes it difficult to dissipate heat. As a result, it may cause the NAND flash memory card to produce unexpected errors in data access due to excessively high temperature, or even make the NAND flash memory card malfunction. Since the NAND flash memory card malfunctions, the computer host 110 would mistakenly consider that the USB memory drive 130 is broken due to the lack of a response from the USB memory drive 130 during data access. Although embodiments of the invention describe the USB interface to connect the computer host 110 as an example, those skilled in the art may apply the invention to another memory drive equipped with a different interface, such as IEEE1394, etc., to connect to the computer host 110, and the invention should not be limited thereto. In other embodiments, those artisans may alternatively implement the computer host 110 as other electronic product, such as a laptop computer, a tablet computer, a mobile phone, a digital camera, a digital recorder, etc., and the invention should not be limited thereto.

Figure 2A:
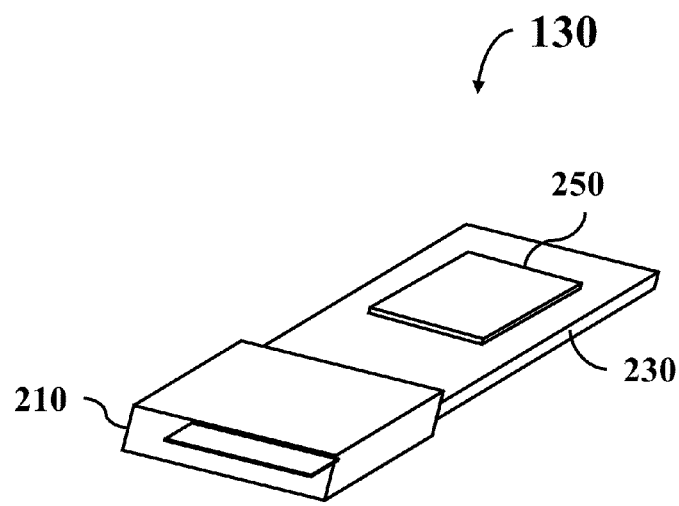
FIGS. 2A and 2B are schematic diagrams of the appearance of a USB memory drive according to an embodiment of the invention.
Figure 2B:
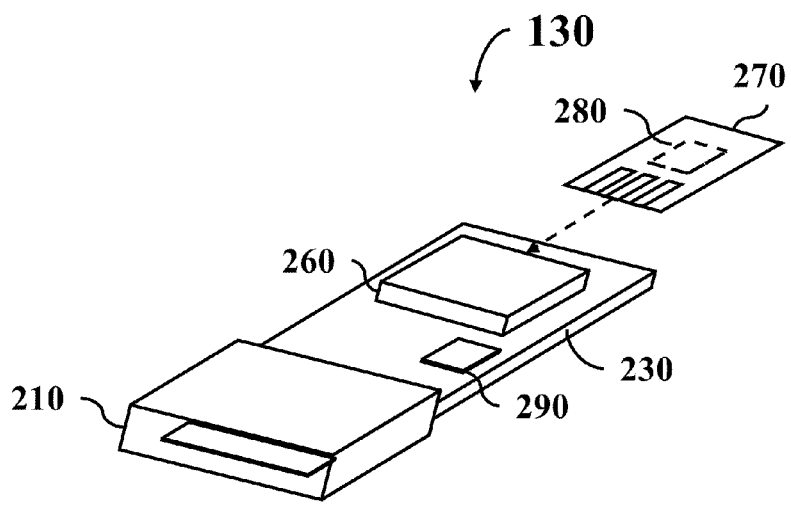

To address the problems described above, an embodiment of the USB memory drive 130 is equipped with a temperature sensor integrate circuit (IC) to detect temperatures in the USB memory drive 130 during data access. An operation is performed to avoid failure of the NAND flash memory card when the temperature exceeds a threshold. Specifically, refer to FIG. 2A. The USB memory drive 130 includes the USB connector 210 and the motherboard 230. One end of the motherboard 230 is connected to the USB connector 210. The bridge IC 250 is disposed on one side of the motherboard 230, and the bridge IC 250 is coupled to the USB connector 210 through a circuit of the motherboard 230. Refer to FIG. 2B. The temperature sensor IC 290 and the card slot 260 is disposed on the other side of the motherboard 230. The temperature sensor IC 290 coupled to the bridge IC 250 through a circuit of the motherboard 230. The flash memory card 270 can be inserted into the card slot 260 and coupled to the bridge IC 250 through a circuit of the motherboard 230. The flash memory card 270 includes the flash controller 280 and a flash module. Generally, when the size of the motherboard 230 is less than 3 cm by 2 cm, heat dissipation would be difficult.

Figure 3:
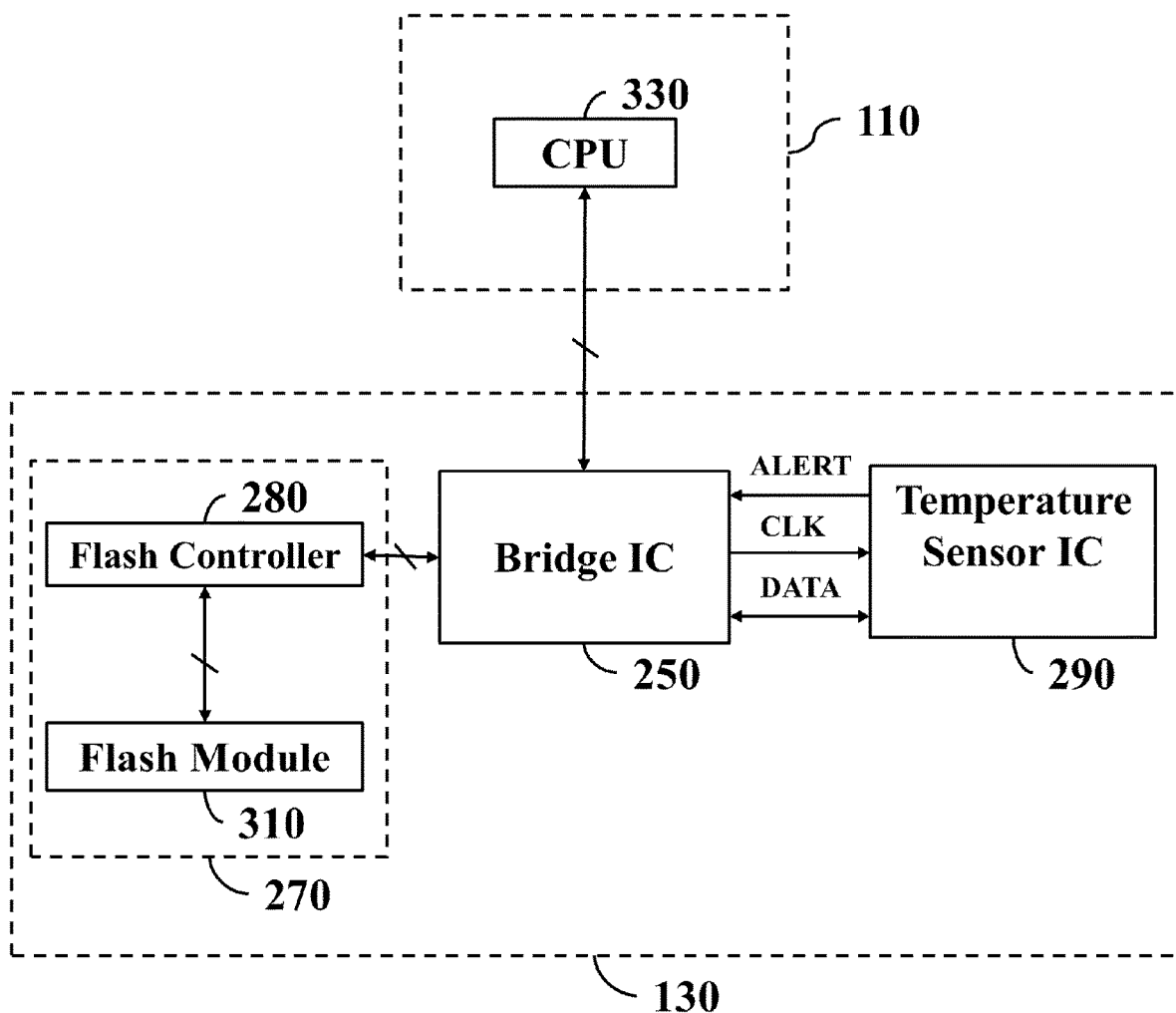
FIG. 3 is a block diagram showing a host side and a USB memory drive according to an embodiment of the invention.

Refer to FIG. 3. The computer host (hereinafter referred to as the host side) 110 includes the central processing unit (CPU) 330, and the USB memory drive (hereinafter referred to as the memory drive) 130 includes the bridge IC 250. The memory drive 130 additionally includes the temperature sensor IC 290, and the flash memory card 270 includes the flash controller 280 and the flash module 310. On the one hand, the bridge IC 250 plays the role of the device side for the CPU 330, and communicates with the CPU 330 through the USB communications protocol. On the other hand, the bridge IC 250 plays the role of the host side for the flash memory card 270, and communicates with the flash memory card 270 through a communications protocol, such as Peripheral Component Interconnect Express (PCI-E), Universal Flash Storage (UFS), Embedded Multi-Media Card (eMMC) protocol, or others. The flash controller 280 and the flash module 310 may communicate with each other by a Double Data Rate (DDR) protocol, such as Open NAND Flash Interface (ONFI), DDR Toggle, or others. The CPU 330 may be implemented in numerous ways, such as with general-purpose hardware (e.g., a single processor, multiple processors or graphics processing units capable of parallel computations, or others) that is programmed using firmware and/or software instructions to perform the functions recited herein.

The bridge IC 250 may be connected to the temperature sensor IC 290 through the Inter-Integrated Circuit (I2C) bus and a General-Purpose Input/Output (GPIO) pin. The bridge IC 250 may feed in the clock signal CLK to the temperature sensor IC 290 to activate the temperature sensor IC 290. The bridge IC 250 may store the threshold in the temperature sensor IC 290 by setting a register of the temperature sensor IC 290 through a data line DATA of the I2C bus. The temperature sensor IC 290 repeatedly measures the temperature of a specific location on the motherboard 230, and issues an alert signal ALERT to the bridge IC 250 through the GPIO pin when the sensed temperature exceeds the threshold being set in the register of the temperature sensor IC 290, so that the bridge IC 250 performs an operation to avoid failure of the NAND flash memory card.

Figure 4:
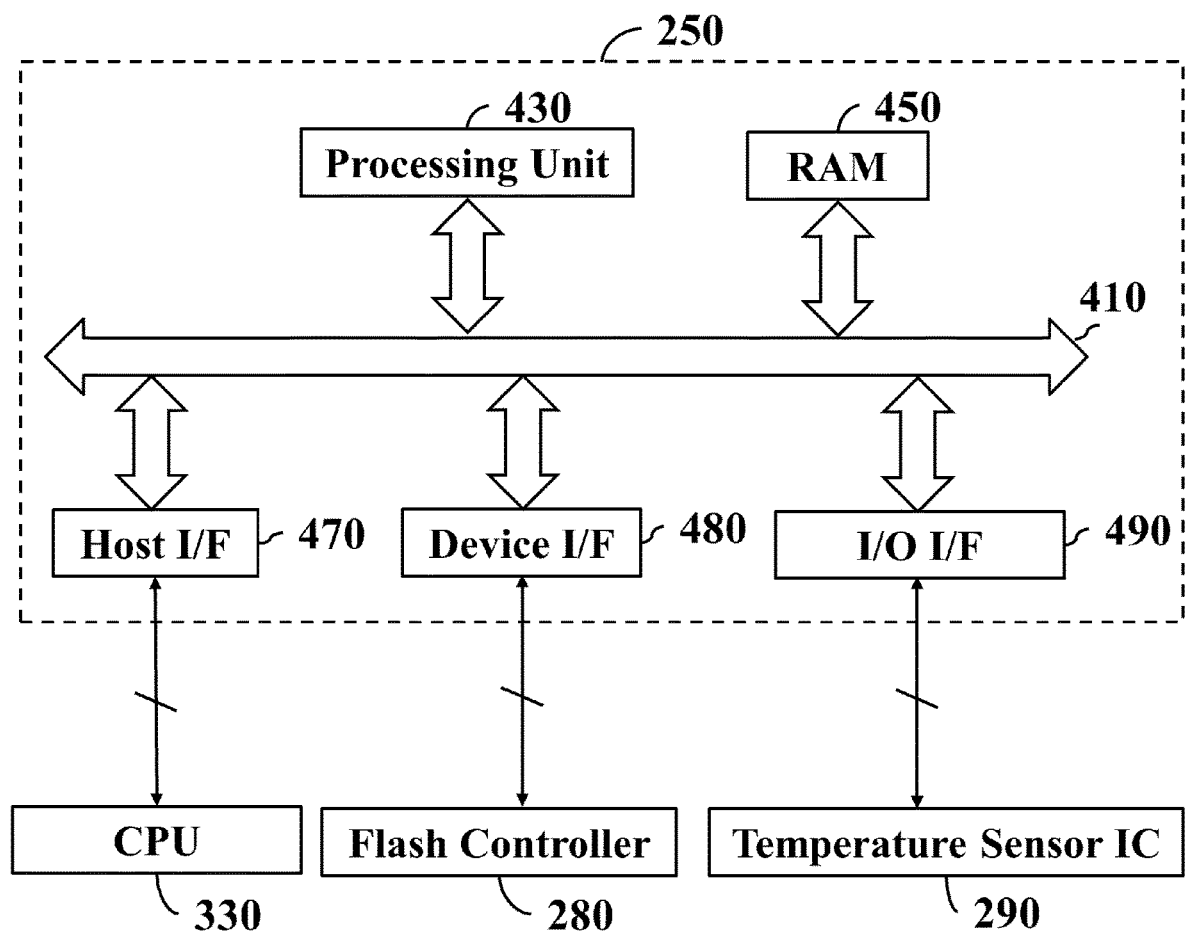
FIG. 4 is a block diagram showing a bridge integrate circuit (IC) with external components according to an embodiment of the invention.

Refer to FIG. 4. The bridge IC 250 includes the processing unit 430, the Random Access Memory (RAM) 450, the host interface (I/F) 470, the device I/F 480, the Input/Output (I/O) I/F 490, and the components 430, 450, 470, 480 and 490 are coupled each other by the bus architecture 410. The bus architecture 410 is utilized between the components 430, 450, 470, 480 and 490 to transfer data, addresses, control signals, etc. The processing unit 430 may be implemented in numerous ways, such as with general-purpose hardware (e.g., a single processor, a micro control unit, multiple processors or graphics processing units capable of parallel computations, or others) that is programmed using firmware and/or software instructions to perform the functions recited herein. The processing unit 430 receives host commands, such as host read, write, trim, erase commands, through the host I/F 470, schedules and executes these commands. The RAM 450 may be implemented in a Dynamic Random Access Memory (DRAM), a Static Random Access Memory (SRAM), or the combination thereof, for allocating space as a data buffer storing user data (also referred to as host data) that is to be programmed into the flash memory card 270, and has been read from the flash memory card 270 and is to be output to the host side 110. The RAM 450 stores necessary data in execution, such as variables, data tables, data abstracts, and so on.

The storage module 310 provides huge storage space typically in hundred Gigabytes (GB), or even several Terabytes (TB), for storing a wide range of user data, such as high-resolution images, video files, etc. The storage module 310 includes control circuits and memory arrays containing memory cells that may be configured as Single Level Cells (SLCs), Multi-Level Cells (MLCs), Triple Level Cells (TLCs), Quad-Level Cells (QLCs), or any combinations thereof. The processing unit 430 communicates with the flash controller 280 through the device interface 480 to programs user data of a designated logical address and reads user data of a designated logical address, where the logical addresses may be represented by Logical Block Addresses (LBAs).

The I/O I/F 490 includes the I2C bus and the GPIO pin as described above. The processing unit 430 sets the threshold to the temperature sensor IC 290, and receives the alert signal indicating that the temperature of the motherboard 230 has exceeded the threshold through the I/O I/F 490. The processing unit 430 may set the threshold to the temperature sensor IC 290 during the host side 110 initializes the memory drive 130, and the threshold may be set to an arbitrary value ranging from 70 degrees Celsius to 90 degree Celsius.

Figure 5:
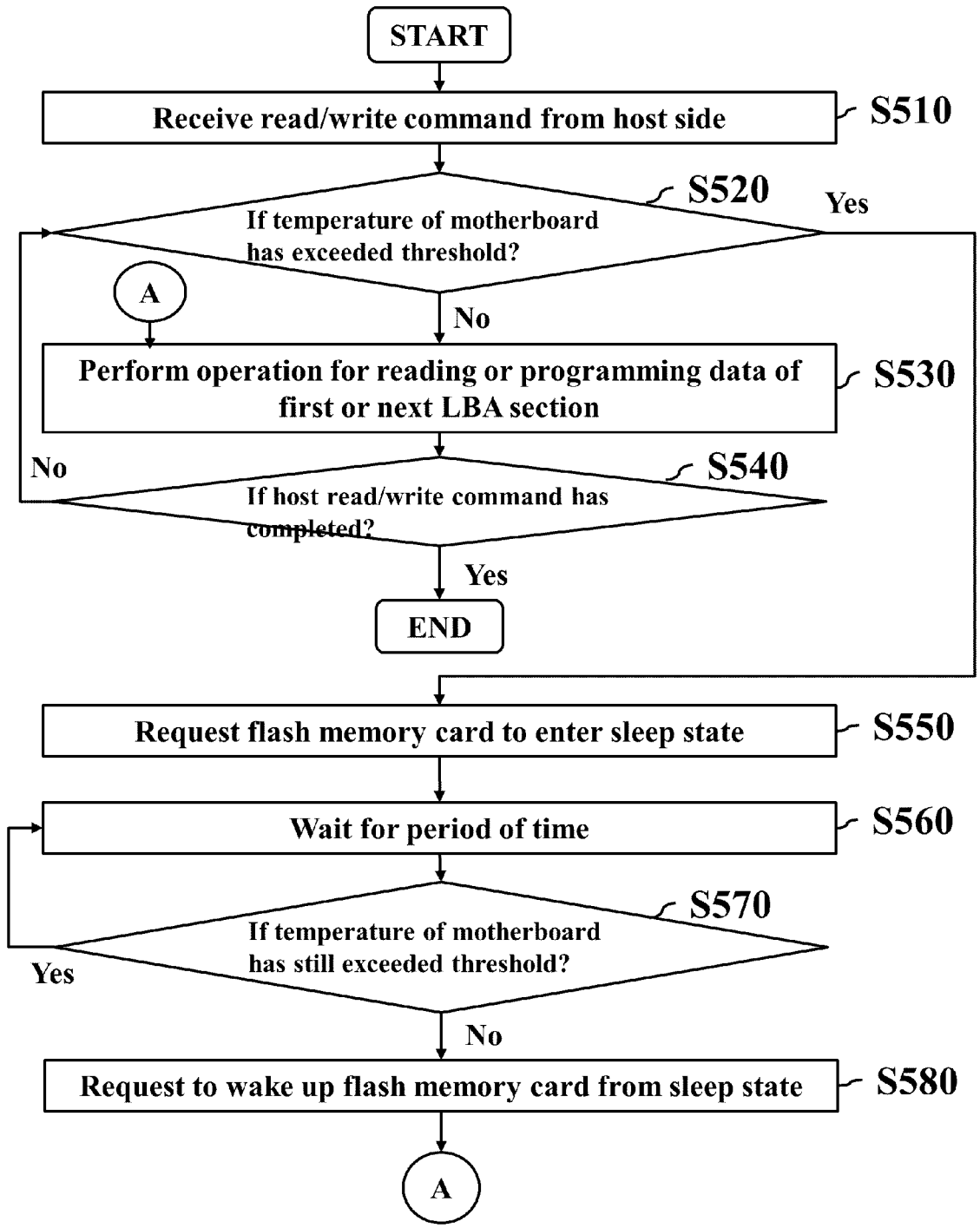
FIG. 5 is a flowchart illustrating a method for controlling access to a flash memory card according to an embodiment of the invention.

With the installed temperature monitoring IC 290, the invention introduces an embodiment of a method for controlling access to a flash memory card, performed by the processing unit 430 when loading and executing relevant firmware, or software instructions. Refer to FIG. 5. Detailed steps are described as follows:

Step S510: A read or write command (also referred to as a host read or write command) is received through the host I/F 470.

Since one host read or write command may instruct the memory drive 130 to read or write a long user data, the method described in the embodiment may divide the entire execution of the host read or write command into several batches according to logical block address (LBA) sections. The temperature of the motherboard 230 is detected before or after each batch is executed. For example, the entire execution of the host read command requesting for reading data from LBA #100 to LBA #399 may be divided into three batches. The first batch performs an operation for reading data from LBA #100 to LBA #199, the second batch performs an operation for reading data from LBA #200 to LBA #299, and the third batch performs an operation for reading data from LBA #300 to LBA #399.

Step S520: It is determined whether the temperature of the motherboard 230 has exceeded the threshold. If so, the process proceeds to step S550. Otherwise, the process proceeds to step S530. The processing unit 430 may judge whether the temperature sensor IC 290 issues the alert signal through the designated GPIO pin of the I/O I/F 490. Once the alert signal is detected, it means that the temperature of the motherboard 230 has exceeded the threshold.

Step S530: An operation is performed for reading or programming data of the first or next LBA section. The processing unit 430 may drive the flash I/F 480 to issue a series of instructions corresponding to this LBA section requested by the host read or write command to instruct the flash controller 280 to perform a specific operation. For the data read operation of one LBA section, the processing unit 430 may drive the device I/F 480 to issue instructions to the flash controller 280 for reading data of this LBA section; store the read data in the RAM 450 temporarily; and drive the host I/F 470 to reply to the host side 110 with the user data of this LBA section. For the data write operation of one LBA section, the processing unit 430 may receive user data of this LBA section to be written through the host I/F 470; store the obtained user data in the RAM 450 temporarily; drive the flash I/F 480 to issue instructions to the flash controller 280 for programming data of this LBA section into the flash memory card 270; and drive the host I/F 470 to reply to the host side 110 with a write completion message.

Step S540: It is determined whether the host read or write command has completed. If so, the whole process ends. Otherwise, the process proceeds to step S520.

Step S550: The flash memory card 270 is requested to enter a sleep state. For example, the processing unit 430 may drive the device I/F 480 to issue an instruction to the flash controller 280 to request the flash memory card 270 to enter the Hibernate state defined in the UFS specification. When the flash memory card 270 enters the Hibernate state, there will be less message exchanges between the bridge IC 250 and the flash controller 280 and between the flash controller 280 and the flash module 310, and the components in the flash controller 280 and the flash module 310 hardly work, so that the temperature of the motherboard 230 would fall.

After the flash memory card 270 enters the sleep state, an embodiment of the method may check whether the temperature of the motherboard 230 falls below the threshold at regular intervals. Once the temperature of the motherboard 230 falls below the threshold, the unfinished data read or write operation is resumed.

Step S560: The process waits for a period of time. The processing unit 430 may set a counter to count to a period of time. When the counter reaches this period of time, a signal is sent to notify the processing unit 430.

Step S570: It is determined whether the temperature of the motherboard 230 has still exceeded the threshold. If so, the process proceeds to step S560. Otherwise, the process proceeds to step S580. The processing unit 430 may judge whether the temperature sensor IC 290 issues the alert signal through the designated GPIO pin of the I/O I/F 490. Once the alert signal is detected, it means that the temperature of the motherboard 230 has still exceeded the threshold.

Step S580: The flash memory card 270 is requested to be awakened from the sleep state for resuming the execution of the unfinished host read or write command. For example, the processing unit 430 may drive the device I/F 430 to issue an instruction to the flash controller 280 to request to wake up the flash memory card 270 from the Hibernate state.

Some or all of the aforementioned embodiments of the method of the invention may be implemented in a computer program such as a driver for a dedicated hardware, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 2 and 3, it should be noted that additional elements may be included to achieve better performance without departing from the spirit of the invention. Each element of FIGS. 2 and 3 is composed of various circuits and arranged operably to perform the aforementioned operations. While the process flows described in FIG. 5 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer program product for controlling access to a flash memory card when executed by a processing unit of a bridge integrate circuit (IC), the non-transitory computer program product comprising program code to:
   determine whether a temperature of a motherboard has exceeded a threshold through a temperature sensor IC after receiving a host read or write command from a host side;
   request a flash memory card to enter a sleep state when the temperature of the motherboard has exceeded the threshold; and
   instruct the flash memory card to perform an operation corresponding to the host read or write command when the temperature of the motherboard hasn't exceeded the threshold,
   wherein the bridge IC and the temperature sensor IC are disposed on the motherboard, the flash memory card is inserted into a card slot on the motherboard, and the bridge IC is coupled to the temperature sensor IC and the flash memory card through a circuit of the motherboard.

2. The non-transitory computer program product of claim 1, comprising program code to:
   issue an instruction to a flash controller of the flash memory card to request the flash memory card to enter a Hibernate state when the temperature of the motherboard has exceeded the threshold.

3. The non-transitory computer program product of claim 1, comprising program code to:
   periodically determine whether the temperature of the motherboard has exceeded the threshold after the flash memory card enters the sleep state; and
   request to wake up the flash memory card from the sleep state for resuming an execution of the unfinished host read or write command when the temperature of the motherboard hasn't exceeded the threshold.

4. The non-transitory computer program product of claim 1, wherein a size of the motherboard is less than 3 cm by 2 cm.

5. A method for controlling access to a flash memory card, performed by a processing unit of a bridge integrate circuit (IC), comprising:
   determining whether a temperature of a motherboard has exceeded a threshold through a temperature sensor IC after receiving a host read or write command from a host side;
   requesting a flash memory card to enter a sleep state when the temperature of the motherboard has exceeded the threshold; and
   instructing the flash memory card to perform an operation corresponding to the host read or write command when the temperature of the motherboard hasn't exceeded the threshold,
   wherein the bridge IC and the temperature sensor IC are disposed on the motherboard, the flash memory card is inserted into a card slot on the motherboard, and the bridge IC is coupled to the temperature sensor IC and the flash memory card through a circuit of the motherboard.

6. The method of claim 5, comprising:
   issuing an instruction to a flash controller of the flash memory card to request the flash memory card to enter a Hibernate state when the temperature of the motherboard has exceeded the threshold.

7. The method of claim 5, comprising:
   periodically determining whether the temperature of the motherboard has exceeded the threshold after the flash memory card enters the sleep state; and
   requesting to wake up the flash memory card from the sleep state for resuming an execution of the unfinished host read or write command when the temperature of the motherboard hasn't exceeded the threshold.

8. The method of claim 5, wherein a size of the motherboard is less than 3 cm by 2 cm.

9. The method of claim 5, wherein the bridge IC, the temperature sensor IC, the motherboard and the flash memory card are assembled in a memory drive.

10. The method of claim 9, comprising:
    setting the threshold to the temperature sensor IC when the memory drive is initialized.

11. The method of claim 10, wherein the threshold is an arbitrary value ranging from 70 degrees Celsius to 90 degree Celsius.

12. The method of claim 5, comprising:
    dividing an execution of the host read or write command into a plurality of batches according to logical block address sections; and
    detecting the temperature of the motherboard through the temperature sensor IC before or after each batch is executed.

13. An apparatus for controlling access to a flash memory card, comprising:
    a host interface (I/F), coupled to a host side;
    a device I/F, coupled to a flash memory card;
    an input/output (I/O) I/F, coupled to a temperature sensor integrate circuit (IC); and
    a processing unit, coupled to the host I/F, the device I/F and the I/O I/F, arranged operably to determine whether a temperature of a motherboard has exceeded a threshold through the temperature sensor IC after receiving a host read or write command from a host side; request the flash memory card to enter a sleep state through the device I/F when the temperature of the motherboard has exceeded the threshold; and instructing the flash memory card to perform an operation corresponding to the host read or write command through the device I/F when the temperature of the motherboard hasn't exceeded the threshold,
    wherein the apparatus and the temperature sensor IC are disposed on the motherboard, the flash memory card is inserted into a card slot on the motherboard, and the apparatus is coupled to the temperature sensor IC and the flash memory card through a circuit of the motherboard.

14. The apparatus of claim 13, wherein the processing unit is arranged operably to issue an instruction to a flash controller of the flash memory card to request the flash memory card to enter a Hibernate state when the temperature of the motherboard has exceeded the threshold.

15. The apparatus of claim 13, wherein the processing unit is arranged operably to periodically determine whether the temperature of the motherboard has exceeded the threshold after the flash memory card enters the sleep state; and request to wake up the flash memory card from the sleep state for resuming an execution of the unfinished host read or write command through the device I/F when the temperature of the motherboard hasn't exceeded the threshold.

16. The apparatus of claim 13, wherein a size of the motherboard is less than 3 cm by 2 cm.

17. The apparatus of claim 13, wherein the apparatus, the temperature sensor IC, the motherboard and the flash memory card are assembled in a memory drive.

18. The apparatus of claim 17, wherein the processing unit is arranged operably to set the threshold to the temperature sensor IC when the memory drive is initialized.

19. The apparatus of claim 18, wherein the threshold is an arbitrary value ranging from 70 degrees Celsius to 90 degree Celsius.

20. The apparatus of claim 13, wherein the processing unit is arranged operably to divide an execution of the host read or write command into a plurality of batches according to logical block address sections; and detect the temperature of the motherboard through the temperature sensor IC before or after each batch is executed.

* * * * *